United States Patent
Rakvic et al.

(10) Patent No.: US 6,954,848 B2
(45) Date of Patent: Oct. 11, 2005

(54) MARKING IN HISTORY TABLE INSTRUCTIONS SLOWABLE/DELAYABLE FOR SUBSEQUENT EXECUTIONS WHEN RESULT IS NOT USED IMMEDIATELY

(75) Inventors: Ryan Rakvic, Santa Clara, CA (US); Christopher Wilkerson, Portland, OR (US); Bryan Black, Austin, TX (US); Edward Grochowski, San Jose, CA (US); John Shen, San Jose, CA (US); Edward Brekelbaum, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 10/038,038

(22) Filed: Jan. 2, 2002

(65) Prior Publication Data

US 2003/0126412 A1 Jul. 3, 2003

(51) Int. Cl.[7] .................................................. G06F 9/30
(52) U.S. Cl. ........................ 712/214; 712/205; 712/216
(58) Field of Search ................................. 712/205, 214, 712/216

(56) References Cited

U.S. PATENT DOCUMENTS

| 5,442,761 A | * | 8/1995 | Toda et al. | 712/205 |
| 5,815,698 A | * | 9/1998 | Holmann et al. | 712/237 |
| 6,553,484 B1 | * | 4/2003 | Sawamura | 712/217 |

* cited by examiner

Primary Examiner—Kenneth S. Kim
(74) Attorney, Agent, or Firm—David N. Tran

(57) ABSTRACT

After an instruction loads data into a register at a first time, the register is monitored to see if it is read in a next clock cycle. When the data is not read in the next clock cycle, the instruction is classified as a slowable instruction. An instruction address associated with the instruction is used to update a history table. The history table stores information to indicate if an instruction is a slowable instruction or a non-slowable instruction. When the instruction address of the instruction is encountered at a second time, the history table is used to determine if the instruction is slowable or non-slowable.

24 Claims, 9 Drawing Sheets

| 105 | Load | R4, [R30] |
|---|---|---|
| 110 | Add | R5, (R32+R31) |
| 115 | Add | R6, (R29+R5) |
| 120 | Load | R10, (R4) |

FIG. 1A (Prior Art)

| R# | Data |
|---|---|
| 0 | |
| 1 | |
| 2 | |
| 3 | |
| 4 | xxxxxxxxxxxxxxxx |
| 5 | yyyyyyyyyyyyyyyy |

FIG. 1B (Prior Art)

| R# 505 | Data 510 | State 515 | Instruction Address 520 |
|---|---|---|---|
| 0 | | 00 | |
| 1 | | 00 | |
| 2 | | 00 | |
| 3 | | 00 | |
| 4 | xxxxxxxxxxxxxxxx | 01 | yyyyyyyyyyyy |
| 5 | | 00 | |
| 6 | | 00 | |
| 7 | | 00 | |
| 8 | | 00 | |
| 9 | | 00 | |

| R# | Data | WTS | RTS | R | Instruction Address |
|---|---|---|---|---|---|
| 0 | | | | 0 | |
| 1 | | | | 0 | |
| 2 | | | | 0 | |
| 3 | | | | 0 | |
| 4 | xxxxxxxxxxxxxx | 56 | 60 | 1 | yyyyyyyyyyyy |
| 5 | | | | 0 | |
| 6 | | | | 0 | |
| 7 | | | | 0 | |
| 8 | | | | 0 | |
| 9 | | | | 0 | |

MARKING IN HISTORY TABLE INSTRUCTIONS SLOWABLE/DELAYABLE FOR SUBSEQUENT EXECUTIONS WHEN RESULT IS NOT USED IMMEDIATELY

FIELD OF THE INVENTION

The present invention relates generally to the field of microprocessor technology. More specifically, the present invention relates to a method and a system for identifying slowable instructions.

BACKGROUND

Computers basically consist of a central processing unit or CPU and a primary storage or memory. The function of the CPU is to execute programs stored in the memory. Each program includes sequences of instructions. Each instruction is associated with a unit of latency. Execution of a program is accomplished by the CPU fetching an instruction stored in the memory, executing the fetched instruction within the CPU, and then proceeding to fetch a next instruction from the memory.

Traditional CPU treats the instructions in a program equally such that each instruction is executed before a next instruction in a logical sequence. For example, the CPU fetches a first instruction in a first cycle, decodes the instruction in a second cycle, and then executes the fetched instruction in a third cycle, before fetching a second instruction in a fourth cycle and repeating the decoding and execution process. These types of processors are referred to as non-pipelined processors.

Modern processors on the other hand have developed what are called pipelines. Pipelines are the most common implementation technique in a CPU today that increases the performance of the system. The idea behind the pipeline is that while the first instruction is being executed, a second instruction can be decoded, and a third instruction can be fetched. Thus, processing of multiple instructions can be overlapped improving overall performance. For example, in a simple three-stage pipeline, instructions are processed by overlapping the fetch, decode and execute phase such that it is possible for the CPU to complete an instruction every cycle as opposed to requiring three cycles per instruction. One problem with pipelining is data dependency. Data dependency refers to a situation when an instruction cannot be executed if its data is not ready.

BRIEF DESCRIPTION OF THE DRAWINGS

The present invention is illustrated by way of example, and not limitation, in the figures of the accompanying drawings in which like references indicate similar elements and in which:

FIG. 1A is an example of a sequence of instructions.

FIG. 1B illustrates an example of a prior art register file.

FIG. 5 illustrates a register file with register state information in accordance with one embodiment of the present invention.

FIG. 7 illustrates a register file with timestamp information in accordance with one embodiment of the present invention.

DETAILED DESCRIPTION

Figure 2:
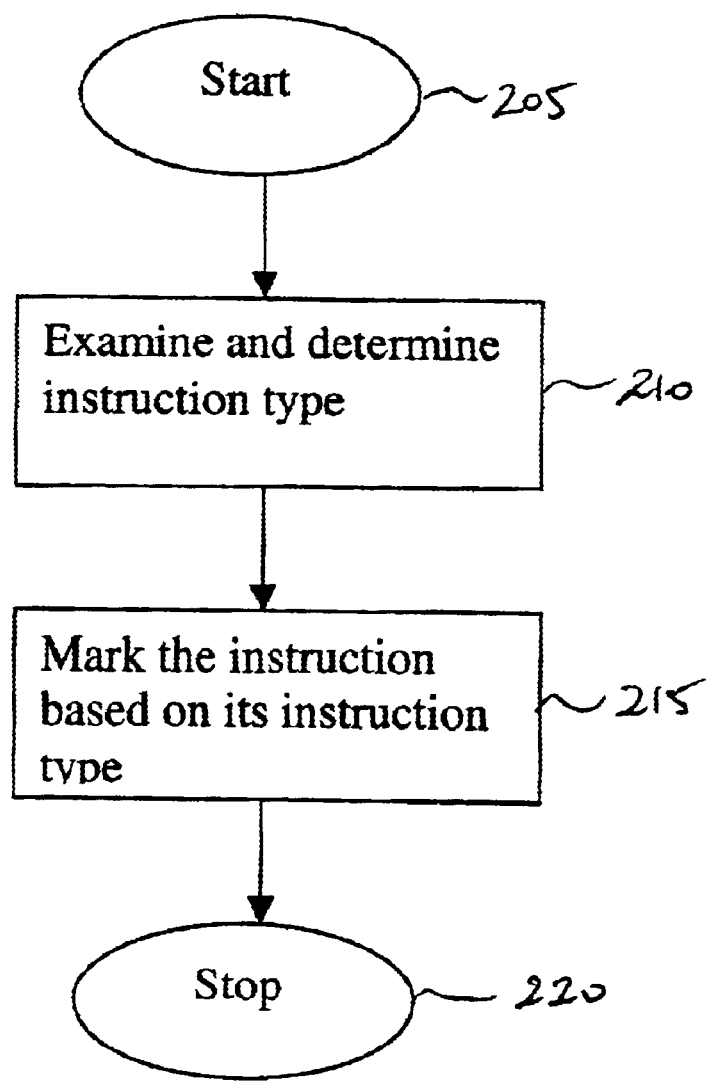
FIG. 2 is a flow diagram illustrating one embodiment of a process of classifying instruction.

In one embodiment, a method for identifying slowable instructions is described. After an instruction loads data into a register, the register is monitored to determine if the data is read from the register during a next clock cycle. When a processor employs bypass logic, the bypass logic is used to determine if the data is read in the next clock cycle. If the data is not read during the next clock cycle, the instruction is marked as a slowable instruction.

Methods and systems for identifying slowable instructions are described herein. In the following description, for purposes of explanation, numerous specific details are set forth to provide a thorough understanding of the present invention. It will be evident, however, to one skilled in the art that the present invention may be practiced without these specific details. In other instances, well known structures, processes, and devices are shown in block diagram form or are referred to in a summary manner in order to provide an explanation without undue detail.

Although the pipeline approach improves performance of the program by overlapping processing of the instructions, the instructions in the program are still processed in a logical sequence as dictated by the program. That is, each instruction is processed (e.g., fetch, decode, and execute) with an assumption that it is a critical or vital to the processing of the next one or more instructions. Each instruction is given highest available resources at a cost to complete its processing. However, this assumption may not necessary be correct for all instructions, and as such valuable resources may be wasted.

In the following description, a slowable instruction refers to an instruction which when its execution time is slowed, there is no effect on the overall performance of the program that the instruction belongs to. A slowable instruction may be a non-vital instruction, which may not need to be executed as soon as possible or as fast as possible. Recognizing that an instruction in a program may be executed multiple times, if that instruction is determined to be a slowable instruction the first time it is executed, it is likely that the same instruction is slowable a next time it is executed.

FIG. 1A is an example of a sequence of instructions. There are four instructions in this example with the first instruction 105 being a load register instruction loading data into register R4. The second and third instructions 110, 115 are addition instructions storing the result of the addition to the registers R5 and R6 respectively. The fourth instruction 120 is another load register instruction loading the content of the register R4 into the register R10. The sequence of instruction may be part of a function (e.g., print) that is called repeatedly from a main program such that the four instructions are executed each time the function is called.

The sequence of instruction indicates that the register R5 is loaded with data by the second instruction 110, and the same data is accessed from the register R5 immediately by the third or next instruction 115. On the contrary, even though the register R4 is loaded with data by the first instruction 105, that same data is not accessed until the fourth instruction 120 is executed. As such, the first instruction 105 does not have to be executed immediately. The data in the register R4 may be ready at any time before the execution of the fourth instruction 120 without affecting behavior of the above sequence of instructions. In addition, there may be other instructions between the first instruction 105 and the fourth instruction 120 which do not access the data in the register R4. Thus, the first instruction 105 is considered to be a slowable instruction, and the second instruction 110 is not considered to be a slowable instruction.

FIG. 1B illustrates an example of a prior art register file. Register file 150 includes a register number field 155 and a data field 160. The register file 150 typically is a memory area used to store data loaded into registers and to read data from registers. For example, after the instruction 105 completes its execution, the register R4 165 is loaded with the data 170. Similarly, after the instruction 110 completes its execution, the register R5 175 is loaded with the data 175. It may be noted that there may be different types of instructions (e.g., Load Register instruction, Add instruction, etc.) that affect content of registers in the register file.

FIG. 2 is a flow diagram illustrating one embodiment of a process of classifying instruction. The process starts at block 205. At block 210, an instruction is examined to determine if it is to be classified as a slowable instruction or as a non-slowable instruction. Different techniques may be used to make this determination. In one embodiment, the data written by the instruction may be monitored to determine if it is read by a next instruction in sequence. In another embodiment, an instruction under examination may be scheduled for execution by a scheduler along with other instructions. Time stamp information may be collected to determine difference in cycles between when data is written into a register by the instruction under examination and when that data is read from the register by another instruction.

At block 215, the instruction is marked according to its classification. In one embodiment, the instruction is marked if it is a slowable instruction using an associated instruction address (IA). This allows the instruction to be recognized as a slowable instruction a next time the instruction address is encountered. In one embodiment, a one-bit flag is used to mark an instruction as a slowable instruction. The process stops at block 220. Although the process in FIG. 2 describes the classification and marking for one instruction, it is understood that each instruction in a sequence of instructions is classified and marked when the instruction is first processed (i.e., decode and execute).

When the slowable instructions are identified, it may be advantageous to allocate valuable processing resources to execute the non-slowable instructions and less valuable processing resources to execute the slowable instructions. This includes, for example, redesigning cache hierarchy, scheduling non-slowable instructions before slowable instructions, applying lower priority resources to slowable instructions and higher priority resources to non-slowable instructions, etc.

Figure 3:
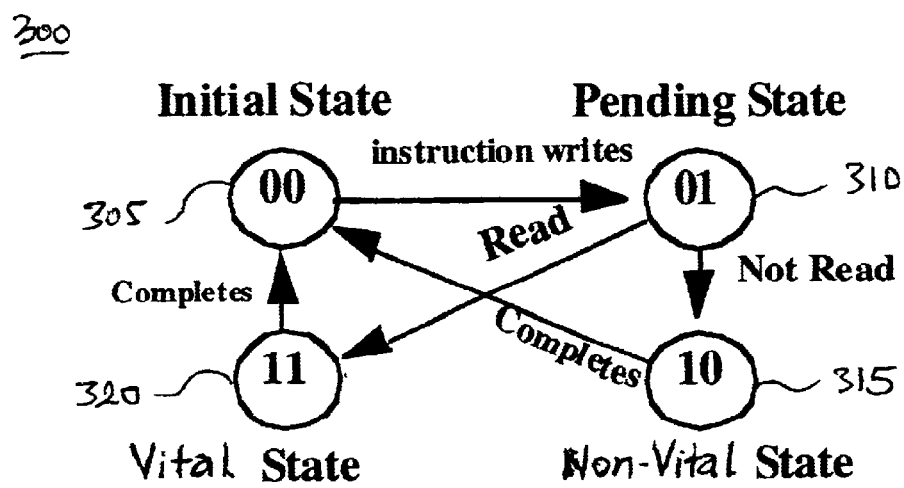
FIG. 3 is an example of a two-bit state machine illustrating states of a register in accordance to one embodiment of the invention.

FIG. 3 is an example of a two-bit state machine illustrating states of a register in accordance to one embodiment of the invention. The state machine 300 includes four states, an initial state 305 ("00"), a pending state 310 ("01"), a vital state 320 ("11"), and a non-vital state 315 ("10"). Initially all of the registers are initialized to the initial state 305. When data is written into the register, the state machine 300 moves from the initial state 305 to the pending state 310. When the data is read from the register or used by the bypass logic in a next clock cycle, the state machine 300 moves from the pending state 310 to the vital state 320. From the vital state 320, the state machine 300 moves back to the initial state 305. Being in the vital state 320 indicates that the data needs to be loaded into the register such that it can be read by a next instruction. From the pending state 310, when the register is not read in the next clock cycle, the state machine 300 moves from the pending state 310 to the non-vital state 315. From the non-vital state 315, the state machine moves back to the initial state 305. When the state machine 300 moves into the vital state 320, this indicates that the load register instruction is not a slowable instruction. When the state machine 300 moves into the non-vital state 320, this indicates the load register instruction is a slowable instruction.

Figure 4:
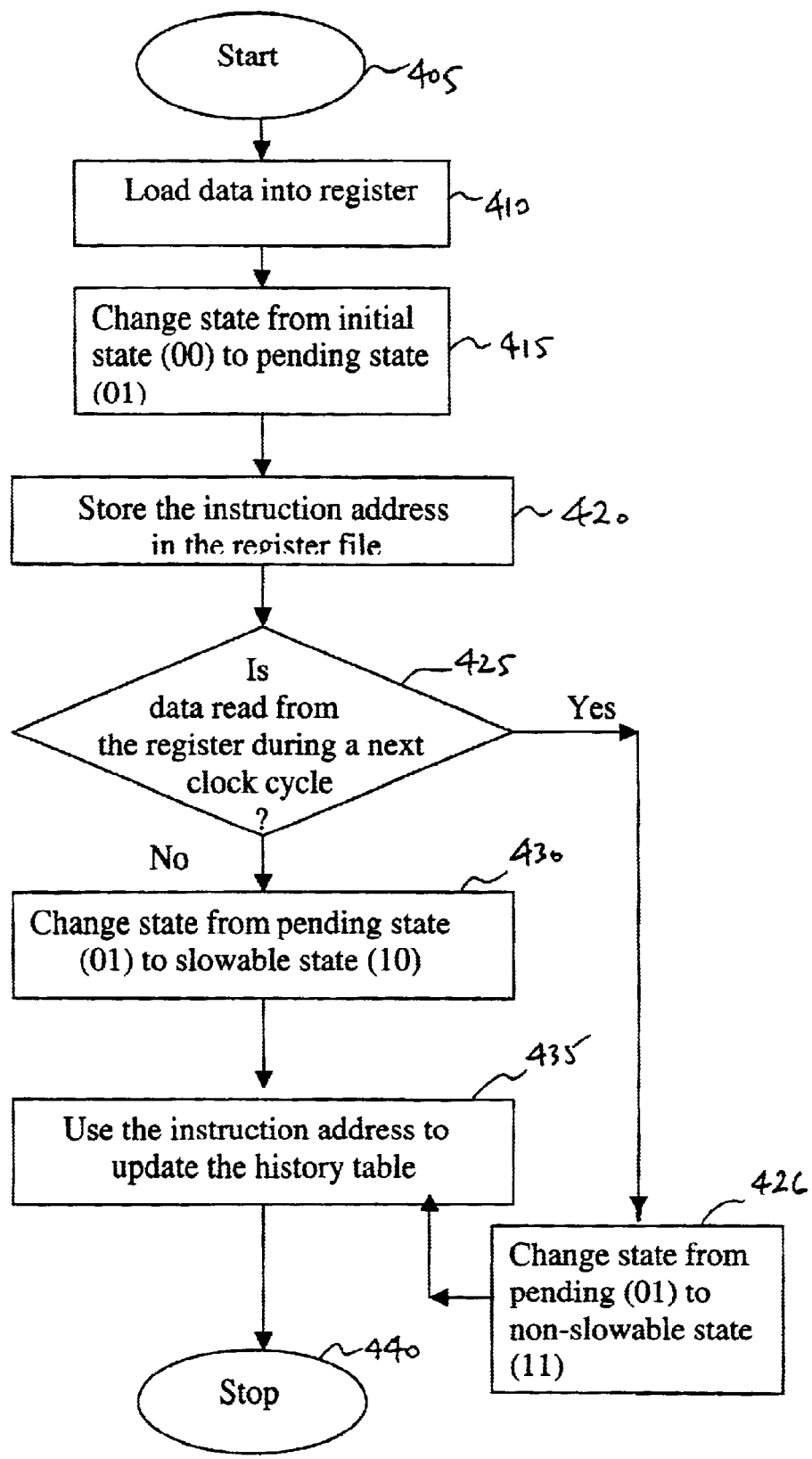
FIG. 4 is a flow diagram illustrating an example of a process of identifying and marking slowable instruction.

FIG. 4 is a flow diagram illustrating an example of a process of identifying and marking slowable instruction using the state machine illustrated in FIG. 3. The process starts at block 405. At block 410, data is loaded into a register upon execution completion of an instruction. For example, the data may be loaded into the register by a load register instruction. At block 415, the register goes from an initial state of "00" to a pending state of "01". At block 420, the instruction address associated with the load register instruction is stored in the register file. The register or the bypass logic is then monitored to see if its data is read in a next clock cycle, as shown in block 425. In one embodiment, if the data is not ready in the next clock cycle, the load register instruction that loaded the data is assumed to be a slowable instruction.

When the data is read from the register in the next clock cycle, the process moves from block 425 to block 426 where the register goes from the pending state of "01" to the non-slowable state of "11". This indicates that the instruction is a non-slowable instruction. The process then flows to block 435.

From block 425, when the data is not read from the register in the next clock cycle, the process moves to block 430 where the register goes from the pending state of "01" to the slowable state of "10". At block 435, the instruction address is used to update an entry associated with the load register instruction in a history table. The history table has multiple entries with each one corresponding to an instruction in a sequence of instructions to be processed. Each of the entries has a value which indicates that the associated instruction is slowable or non-slowable. The process stops at block 440.

FIG. 5 illustrates a register file with register state information in accordance with one embodiment of the present invention. Implementation of the register file 500 is similar to typical register files illustrated in FIG. 1B including the register field 505 and the data field 510, but with the addition of the state field 515 and the instruction address field 520. The state field 515 may be a two-bit field storing the state of the register, as described above with FIG. 3. The instruction address field 520 stores the instruction address of the load register instruction being examined to determine whether it is slowable or non-slowable.

Figure 6:
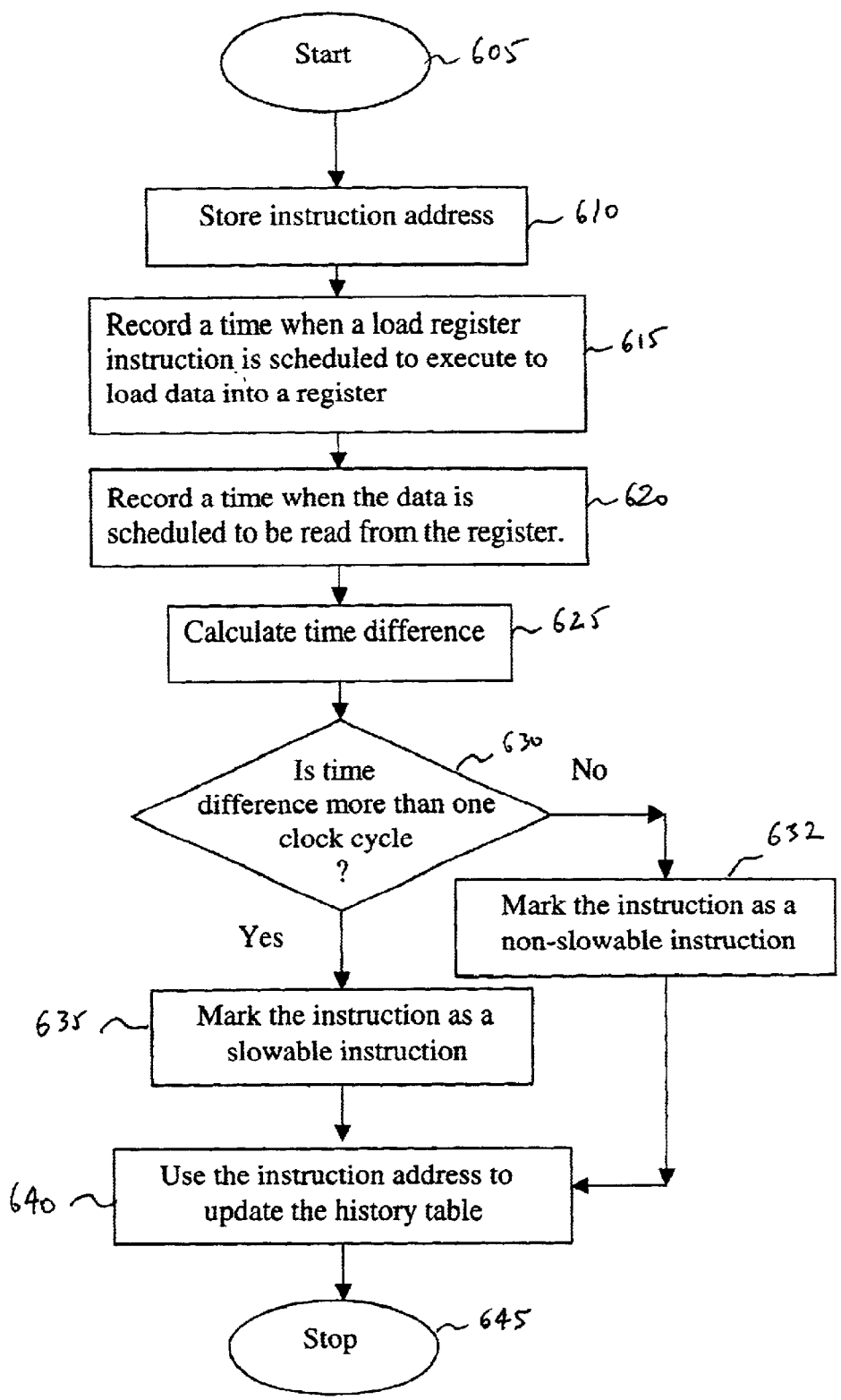
FIG. 6 is a flow diagram illustrating an example of a process of identifying and marking slowable instruction using time stamping.

FIG. 6 is a flow diagram illustrating an example of a process of identifying and marking slowable instruction using time stamping. The process starts at block 605.

Instructions in an instruction sequence may be scheduled by a scheduler prior to execution. The scheduler determines when each instruction is to execute and when it is to complete using, for example, cycle numbers. Using the scheduling and the cycle number information, it is possible to record a time when a register is loaded with data, and a time when the data is read from that register even before execution of the load register instruction.

At block 610, the instruction address of an instruction that loads data into a register is stored. At block 615, the time the register is to be loaded with data is recorded. At block 620, the time the data is read from the register is recorded. At block 625, a difference between the time the data is loaded into the register and the time the data is read from the register is calculated.

At block 630, a test is made to determine if the calculated time difference is more than one clock cycle. When the time difference is more than one clock cycle, the process moves from block 630 to block 635 where the instruction is marked as a slowable instruction. At block 640, the instruction address of the slowable instruction is used to update the history table. The history table includes multiple entries corresponding to the number of instructions to execute. Each entry is a one bit indicator or flag that indicates whether the instruction is slowable or non-slowable.

From block 630, when the time difference is not more than one clock cycle, the process moves from block 630 to block 632, where the instruction is marked as a non-slowable instruction. The process then moves from block 632 to block 640 where the instruction address is used to update the history table. The process stops at block 645. Although the load register instruction is used in this example, other instructions that load data into the register may also be used.

The process illustrated in FIG. 6 is different from the process in FIG. 4 in that the instruction may be identified as slowable or non-slowable prior to any execution. On the contrary, the process in FIG. 4 requires at least one execution of the instruction before it is possible to determine whether the instruction is slowable or non-slowable. In one embodiment, using the process in FIG. 6, a time threshold longer than one clock cycle may be used to determine whether an instruction is slowable or non-slowable. For example, the test made in block 630 may be changed to determine if the time difference is more than three clock cycles.

FIG. 7 illustrates a register file with timestamp information in accordance with one embodiment of the present invention. Implementation of the register file 700 is similar to typical register files illustrated in FIG. 1B including the register field 705 and the data field 710, but with the addition of a write timestamp (WTS) field 715, a read timestamp (RTS) field 720, a read field 725, and an instruction address field. The read field 725 may be a single-bit field used to indicate whether the data in the register is read (or accessed) in a time difference longer than a time threshold. In this example, the register "R4" is loaded with data at clock cycle 56 (shown in the WTS field 715) and is accessed at clock cycle 60 (shown in the RTS field 720). Correspondingly, the read field 725 is set to "1" to indicate that the instruction is not read within a time threshold and therefore is slowable. The read field 725 is normally set to a default value corresponding to a non-slowable value.

Figure 8:
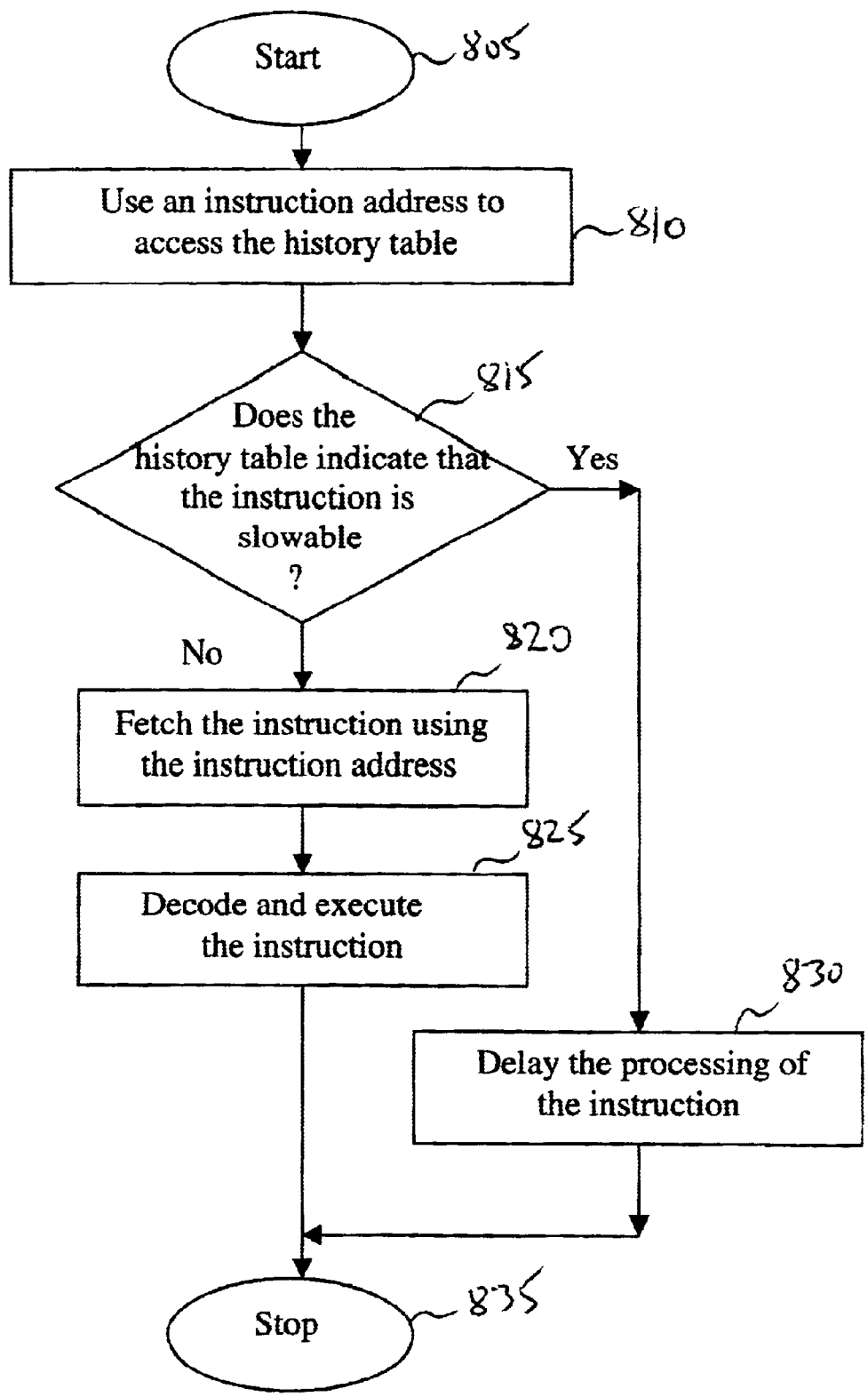
FIG. 8 is a flow diagram illustrating an instruction type look-up process in accordance to the present invention

FIG. 8 is a flow diagram illustrating an instruction type look-up process in accordance to the present invention. The process may be used with the identifying and marking instruction type process illustrated in FIG. 4 or in FIG. 6. The process starts at block 805. At block 810, an instruction address is used to index into a history table to retrieve the instruction type associated with the instruction. As described above, the instruction type is either slowable or non-slowable.

At block 815, a test is made to determine if the instruction is slowable or non-slowable. When the instruction is slowable, the process moves from block 815 to block 830 where processing of the instruction is delayed. This may include, for example, allocating lower priority resources to process the instruction.

From block 815, when the instruction is non-slowable, the process moves to block 820 where the instruction is processed immediately. This includes fetching the instruction using the instruction address, as shown in block 820, and decoding and executing the instruction, as shown in block 825. The process stops at block 835.

Figure 9:
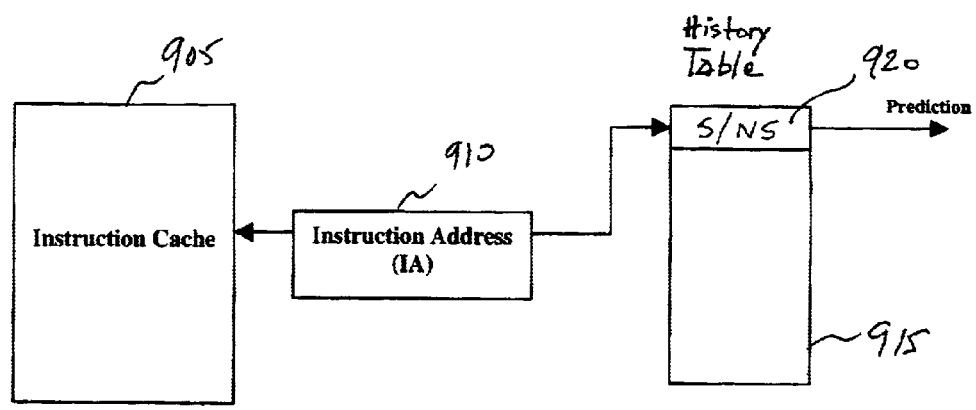
FIG. 9 is a block diagram illustrating an example of a look up mechanism.

FIG. 9 is a block diagram illustrating an example of a look up mechanism to determine an instruction type. The block diagram includes an instruction cache 905, an instruction pointer 910 and a history table 915. The history table 915 contains one bit entries having static values of "0" or "1" to correspond to a slowable type or a non-slowable type. Typically, an instruction address of an instruction to be processed is loaded into the instruction pointer 910. The instruction address is then used to index into the instruction cache 905 to retrieve the associated instruction. In one embodiment, the same instruction address is used to index into the history table 915 to retrieve the instruction type information (slowable/non-slowable). Using this mechanism, it is possible to know the instruction type of an instruction even before decoding the instruction the second time the instruction is encountered. This is because each instruction is located at the same instruction address no matter how many times the instruction is executed. One advantage of this technique is that the decoding process of the instruction can be delayed once the history table indicates that the instruction is slowable.

The operations of the various methods of the present invention may be implemented by a processing unit in a digital processing system, which executes sequences of computer program instructions which are stored in a memory which may be considered to be a machine readable storage media. The memory may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the processing unit.

In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hardwired circuitry may be used in place of or in combination with software instructions to implement the present invention. Thus, the present invention is not limited to any specific combination of hardware circuitry and software, nor to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:
   executing an instruction that updates data in a register at a first time;
   storing an instruction address of the instruction;
   when the data is not read from the register at a next clock cycle from completion of execution of the instruction, setting a bit associated with the instruction address to indicate that the instruction is a slowable instruction; and
   when the instruction address of the instruction is encountered a second time and the bit indicates that the instruction is a slowable instruction, delaying processing of the instruction.

2. The method of claim 1, wherein when the instruction address of the instruction is encountered the second time, the bit is examined to determine if the instruction is a slowable instruction.

3. The method of claim 1, wherein delaying the processing of the instruction comprises delaying decoding the instruction.

4. The method of claim 1, wherein delaying the processing of the instruction comprises using lower priority resources to execute the instruction.

5. The method of claim 1, wherein delaying the processing of the instruction comprises delaying loading the data into the register until prior to the data is read from the register.

6. A method, comprising:
   recording a first clock cycle when an instruction that loads data into a register is to complete;
   storing an instruction address of the instruction;
   recording a second clock cycle when the data is read from the register;
   when the second clock cycle is more than one clock cycle from the first clock cycle, setting a bit associated with the instruction address to indicate that the instruction is a slowable instruction; and
   when the instruction address is encountered a next time, and the bit indicates that the instruction is the slowable instruction, delaying processing of the instruction.

7. The method of claim 6, wherein the processing of the instruction is delayed by delaying decoding the instruction.

8. The method of claim 6, wherein the processing of the instruction is delayed by using lower priority resources to execute the instruction.

9. The method of claim 6, wherein information about the first clock cycle and the second clock cycle is provided by a scheduler.

10. The method of claim 9, wherein the scheduler provides the information about the first clock cycle and the second clock cycle prior to execution of the instruction.

11. A computer readable medium having stored thereon sequences of instructions which are executable by a system, and which, when executed by the system, cause the system to perform a method, comprising:
   executing an instruction that loads data into a register at a first time;
   storing an instruction address of the instruction;
   when the data is not read from the register at a next clock cycle from completion of execution of the instruction, setting a bit associated with the instruction address to indicate that the instruction is a slowable instruction; and
   when the instruction address of the instruction is encountered a second time and the bit indicates that the instruction is a slowable instruction, delaying processing of the instruction.

12. The computer readable medium of claim 11, wherein delaying the processing of the instruction comprises delaying decoding the instruction.

13. The computer readable medium of claim 11, wherein delaying the processing of the instruction comprises using lower priority resources to execute the instruction.

14. The computer readable medium of claim 11, wherein delaying the processing of the instruction comprises delaying loading the data into the register until prior to the data is read from the register.

15. A computer readable medium having stored thereon sequences of instructions which are executable by a system, and which, when executed by the system, cause the system to perform a method, comprising:
   recording a first clock cycle when an instruction is to complete storing data in a register;
   storing an instruction address of the instruction;
   recording a second clock cycle when the data is read from the register;
   when the second clock cycle is more than one clock cycle from the first clock cycle, setting a bit associated with the instruction address to indicate that the instruction is a slowable instruction; and
   when the instruction address is encountered a next time, and the bit indicates that the instruction is the slowable instruction, delaying processing of the instruction.

16. The computer readable medium of claim 15, wherein the processing of the instruction is delayed by delaying decoding the instruction.

17. The computer readable medium of claim 15, wherein the processing of the instruction is delayed by using lower priority resources to execute the instruction.

18. The computer readable medium of claim 15, wherein information about the first clock cycle and the second clock cycle are provided by a scheduler.

19. The computer readable medium of claim 18, wherein the scheduler provides the information about the first clock cycle and the second clock cycle prior to execution of the instruction.

20. A system, comprising:
   a memory; and
   a processor coupled to the memory and to perform operations comprising:
      executing an instruction that updates data in a register at a first time;
      storing an instruction address of the instruction;
      when the data is not read from the register at a next clock cycle from completion of execution of the instruction, setting a bit associated with the instruction address to indicate that the instruction is a slowable instruction; and when the instruction address of the instruction is encountered a second time and the bit indicates that the instruction is a slowable instruction, delaying processing of the instruction.

21. The system of claim 20, wherein the processing of the instruction is delayed by using lower priority resources to execute the instruction.

22. The system of claim 20, wherein the processing of the instruction is delayed by delaying decoding the instruction.

23. A system, comprising:

means for recording a first clock cycle when an instruction that loads data into a register is to complete;

means for storing an instruction address of the instruction;

means for recording a second clock cycle when the data is read from the register;

when the second clock cycle is more than one clock cycle from the first clock cycle, means for setting a bit associated with the instruction address to indicate that the instruction is a slowable instruction; and when the instruction address is encountered a next time, and the bit indicates that the instruction is the slowable instruction, means for delaying processing of the instruction.

24. The system of claim 23, wherein the means for delaying the processing of the instruction comprises means for delaying decoding of the instruction.

* * * * *